United States Patent
Jackson et al.

(10) Patent No.: US 10,296,295 B1
(45) Date of Patent: May 21, 2019

(54) PORTABLE ENTERTAINMENT BALL

(71) Applicants: Roxanne Jackson, Matteson, IL (US); Sandra Ann Bryant, Matteson, IL (US)

(72) Inventors: Roxanne Jackson, Matteson, IL (US); Sandra Ann Bryant, Matteson, IL (US)

( * ) Notice: Subject to any disclaimer, the term of this patent is extended or adjusted under 35 U.S.C. 154(b) by 0 days.

(21) Appl. No.: 16/238,755

(22) Filed: Jan. 3, 2019

Related U.S. Application Data (60) Provisional application No. 62/614,043, filed on Jan. 5, 2018.

(51) Int. Cl.
  *G07C 15/00* (2006.01)
  *G06F 7/58* (2006.01)
  *G07F 17/32* (2006.01)

(52) U.S. Cl.
  CPC ............ *G06F 7/588* (2013.01); *G07F 17/329* (2013.01)

(58) Field of Classification Search
  CPC ...... G07C 15/001; G07F 17/329; G06F 7/588
  See application file for complete search history.

(56) References Cited

U.S. PATENT DOCUMENTS

| | | | |
|---|---|---|---|
| 9,892,597 B1* | 2/2018 | Trepp ................. | G07F 17/3209 |
| 2001/0033055 A1* | 10/2001 | Naden ................. | G07C 15/001 |
| | | | 273/144 A |
| 2010/0094878 A1* | 4/2010 | Soroca ................. | G06Q 30/02 |
| | | | 707/748 |
| 2014/0315614 A1* | 10/2014 | Granich ............... | G07F 17/329 |
| | | | 463/17 |
| 2016/0203675 A1* | 7/2016 | Lutnick .............. | G07F 17/3232 |
| | | | 463/16 |

* cited by examiner

*Primary Examiner* — James S. McClellan
*Assistant Examiner* — Kevin M Carter
(74) *Attorney, Agent, or Firm* — Fraline Allgaier (57) ABSTRACT

A portable entertainment ball for random number selection and having a size suitable for handheld use is disclosed. The portable entertainment ball includes a display screen having a user interface showing specific lottery offerings and random number selection options, a processor having one or more custom-programmed software and databases including a plurality of lottery play patterns, lottery multipliers, lottery numbers, lottery number ranges, winning lottery numbers, audio programs, and a random number generating computer program. A housing wall is further configured to have a number selection panel in communication with said processor to select numbers for a specific lottery play pattern, a specific lottery multiplier, or a plurality of number ranges.

8 Claims, 8 Drawing Sheets

FIG. 1

| LOTTERY 34 | PLAY PATTERNS 42  36 | PREVIOUS WINNING NUMBERS AND MULTIPLIERS 38 | RANDOM NUMBERS SELECTED |
|---|---|---|---|
| POWER BALL | SELECT 5 NUMBERS BETWEEN 1 AND 69 SELECT 1 POWER BALL BETWEEN 1 AND 26 | 9 10 25 37 38  (9) | 11 18 29 33 23  (7) |
| MEGA MILLION | SELECT 5 NUMBERS BETWEEN 1 AND 70 SELECT 1 MEGA BALL BETWEEN 1 AND 25 | 5 25 38 52 67  (24) | 6 25 37 32 47  (21) |
| LOTTO | SELECT 6 NUMBERS BETWEEN 1 AND 62 SELECT 1 EXTRA SHOT ADD 1$ | 28 30 37 41 42 45  (11) | 22 23 34 40 42 11  (9) |
| LUCKY DAY LOTTO | SELECT 5 NUMBERS BETWEEN 1 AND 45 | 20 24 26 29 45 | 11 34 16 22 43 |
| PICK 3 FIREBALL | SELECT 3 NUMBERS BETWEEN 0 AND 9 SELECT FIREBALL FOR $1 | 6 0 2  (8) | 0 0 2  (5) |
| PICK 4 FIREBALL | SELECT 4 NUMBERS BETWEEN 0 AND 9 SELECT 1 FIREBALL FOR $1 | 0 7 7 1  (7) | 5 0 3 1  (4) |

PORTABLE ENTERTAINMENT BALL

This application claims priority of U.S. Provisional Application Ser. No. 62/614,043 filed Jan. 5, 2018, the entire contents of which are incorporated herein by reference thereto. The present invention relates generally to a consumer-oriented device. More specifically, the present invention relates to the combination of select electronic devices, custom databases, and a random number generator for entertainment purposes.

BACKGROUND OF THE INVENTION

Government sponsored and operated lotteries are the most common form of gambling in the United States. In the words of one state lottery official, "Lotteries are different from any other gaming product. Lottery players risk a small amount of money against very long odds to win a large prize, with the net proceeds going to the public good." The fact that the player needs only a small amount of money to participate ensures a high frequency of lottery ticket purchases in the future.

For consumers choosing to participate in government lotteries, there is a vast universe of available options and choices. Forty-six (46) states in America currently operate lotteries with widely varying games, odds, and payouts. These individual state-run games are augmented by huge, multi-state lotteries, such as Mega Million and PowerBall. The profits from these lotteries are typically utilized to fund various state legislature-approved activities and programs, such as education, environmental protection, and crime control.

Regardless of the lottery game chosen, the player always has the opportunity to select his or her own numbers. Otherwise, the player can allow the retail lottery ticket vendor to use a random number generator to pick the numbers for their individual ticket.

Allowing a third-party computer to determine the ticket numbers of frequent lottery players has caused many to feel "detached" from the process and totally void of input and control. The present invention fills that gap. It provides the lottery player the fun, convenience, and ownership of their own random number generator. With a personal entertainment ball, they will always have numbers created on their device for future lottery ticket purchases.

BRIEF SUMMARY OF THE INVENTION

It is an advantage of the present invention to provide a portable entertainment ball that is made of a durable material, has a size suitable for handheld use, and used for the random selection of numbers for specific lottery games. The production of the portable entertainment ball is efficient and effective and can be completed with the use of materials that are flexible, smooth, and are conducive for the physical connection of decorative elements, opening and closing of the ball for re-programming, and overall ease of handheld use.

It is an additional advantage of the present invention to provide a portable entertainment ball that incorporates a dynamic screen that can be easily constructed of the liquid crystal display type such that a user can easily select lottery games and pick random lottery numbers.

It is an additional advantage of the present invention to provide a portable entertainment ball utilizing a memory device, one or more custom-programmed software, and extensive databases. The extensive databases providing for the user a database of lottery games and lottery play patterns, lottery multipliers, lottery number ranges, and audio programs.

It is an additional advantage of the present invention to provide a portable entertainment ball having a random number generating computer program utilizing a series of math functions combined with a time injector to produce the chance sequence of numbers required for a selected lottery game.

It is an additional advantage of the present invention to provide a portable entertainment ball that is adapted to provide a plurality of random selection buttons that are arranged on the housing wall of the ball. The buttons are reconfigurable to provide a plurality of number selection programs and to produce randomly selected numbers. The various circuit connections can be rearranged for each random selection button to provide for new lottery game selections and multipliers.

Additional advantages and features of the present invention will become more apparent when considered in light of the following specification and drawings.

In some embodiments of the portable entertainment ball, the number selection panel can be multiplied to reflect any changes in the one or more custom-programmed software and databases and the location of the single number selection buttons being determined by a specific lottery play pattern. This multiplication can include a plurality of lottery multiplier buttons or buttons increasing the number of randomly selected numbers. The spacing within the number selection panel can be further determined by the plurality of lottery games, the generated and stored numbers based on the number of lottery number ranges, and the required amount of numbers for lottery games.

In some later embodiments, the processor can be adapted to provide wireless connection and pairing to additional portable entertainment balls and other wireless devices such as for the purposes of instant communication, access to mobile applications, quick updates, and access to instant lottery plays. In some embodiments, the portable entertainment ball can include additional programming data including video displays, mobile apps, maps, store locations, and wagering facilities.

DETAIL DESCRIPTIONS OF THE INVENTION

An exemplary application of the present invention is described as follows. All illustrations of the drawings are for the purpose of describing selected versions of the present invention and are not intended to be limiting in scope. It will be apparent to a person having ordinary skill in the art that the invention as presented is useable with or without some of the various parts described. The present invention is an electronic device that generates random numbers for the user.

The portable entertainment ball 10 is made of a durable material, has a size suitable for handheld use, and used for the random selection of numbers for specific lottery games. The production of the portable entertainment ball as described herein is efficient and effective and can be completed with the use of materials that are flexible, smooth, and are conducive for the physical connection of decorative elements, opening and closing of the ball for re-programming, and overall ease of handheld use.

The portable entertainment ball 10 has a circular globe shape. This circular configuration is advantageous by providing a small form for the selection of numbers on the display screen 12 and for the quick transfer of numbers to another device. However, it is provided that the inventor contemplates additional shapes, which can be reduced in size and held securely in the hand. The inventor further contemplates adjusting the circular shape of the portable entertainment ball to provide for at least one shallow or flattened area that makes the device more stable when positioned on a desk or similar flat surface.

Figure 2:
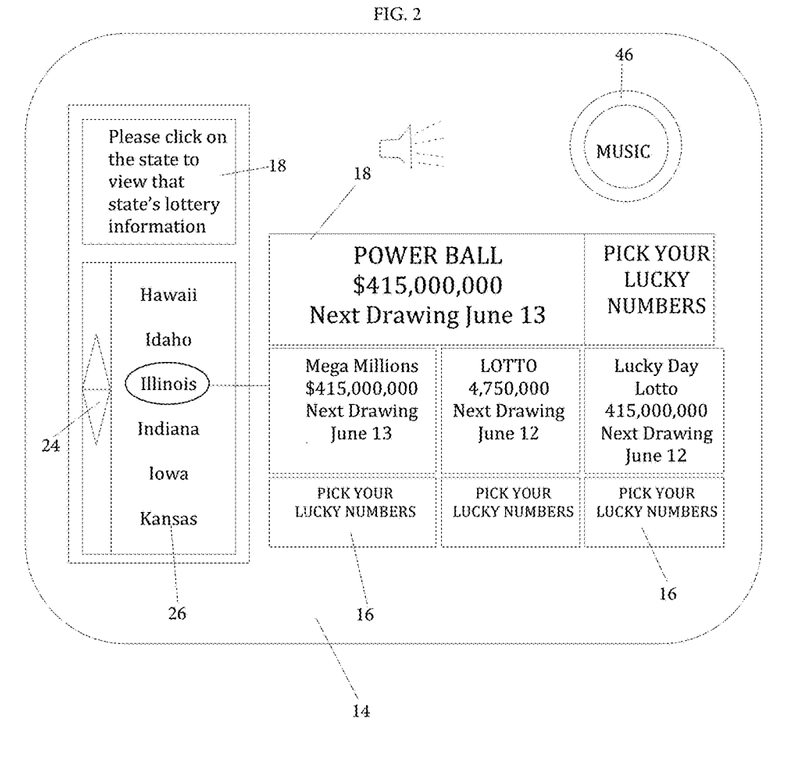
FIG. 2 depicts an exemplary user interface in accordance with the preferred embodiment of the present invention.
Figure 3:
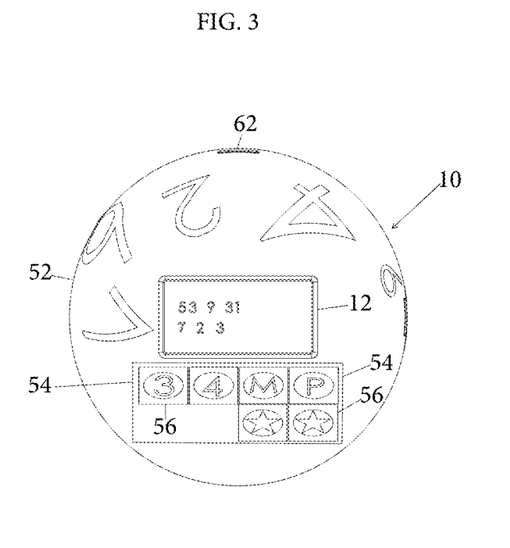
FIG. 3 illustrates a top perspective view of an exemplary portable entertainment ball of the present invention.
Figure 4:
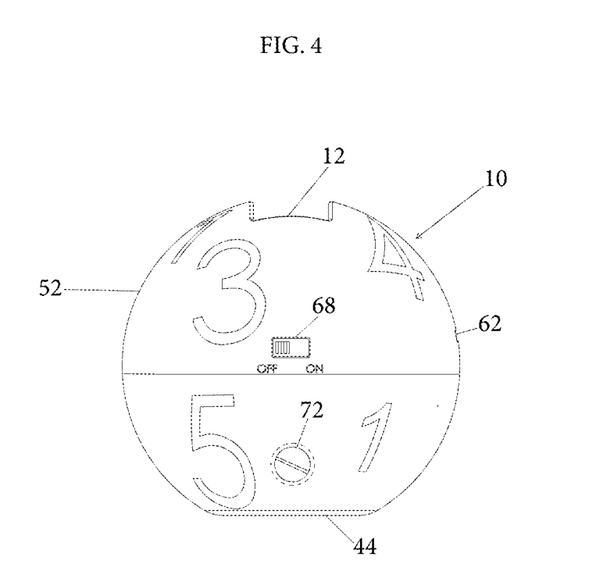
FIG. 4 illustrates a side view of an exemplary portable entertainment ball of the present invention.

The portable entertainment ball 10 further comprising a display screen 12 being mounted thereon. The display screen 12 having a user interface 14 providing random number selection options 16, selection parameters 18 for lottery games, LED lights 22 that blink during the number selection process, navigation buttons 24 that allow for scrolling through a list of states 26 offering lotteries, a processor 28, and a memory device 32 coupled to the processor 28. The memory device 32 stores instructions that are adapted to be executed by the processor 28 and one or more custom-programmed software, and databases.

Figure 1:
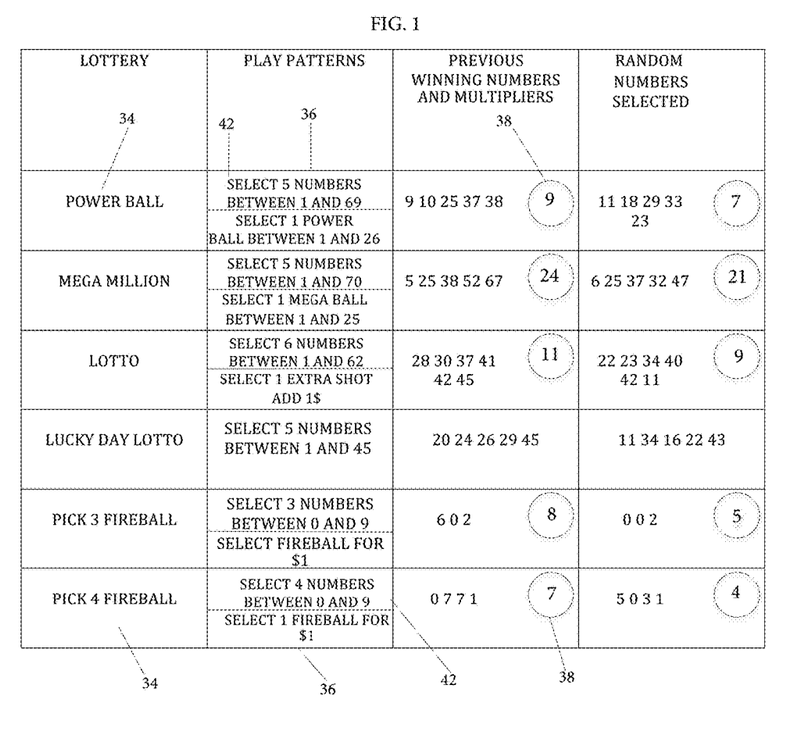
FIG. 1 is a table depicting the random number selection and real-world lottery data in accordance with the preferred embodiment of the present invention.

Once the state 26 has been selected and the "Enter" button pushed, all lottery games offered by that specific state 26 will be displayed. Now, the player will scroll through that list and select the lottery game they would like to play. Again, the "Enter" button is pushed. The user now pushes the number selection button on the portable entertainment ball 10 to activate the internal random number generator. The invention's databases and software then limits the random number generator to the creation of numbers within the range 42 associated with that particular game. In a few seconds, the screen 12 displays random lottery numbers for the desired game. At the option of the user, a number selection button 56 is pressed to obtain a different set of random numbers for a chosen lottery game 34. This feature enhances the fun, utility, and entertainment value of the present invention. The random number generator computer chosen for the invention utilizes a series of math functions combined with a time injector to produce the chance sequence of numbers required for the selected lottery game in the chosen state 26.

The one or more custom-programmed software and databases are stored in the memory device 32 and configured to be executed by the processor 28. The one or more custom-programmed software and databases include generating and storing numbers based on a plurality of lottery games 34 and specific lottery play patterns 36, specific lottery multipliers 38, generating and storing numbers based on a plurality of lottery number ranges 42, generating the required amount of numbers for lottery games 34, storing audio programs 46, and utilizing a random number generating computer program 48.

Figure 5:
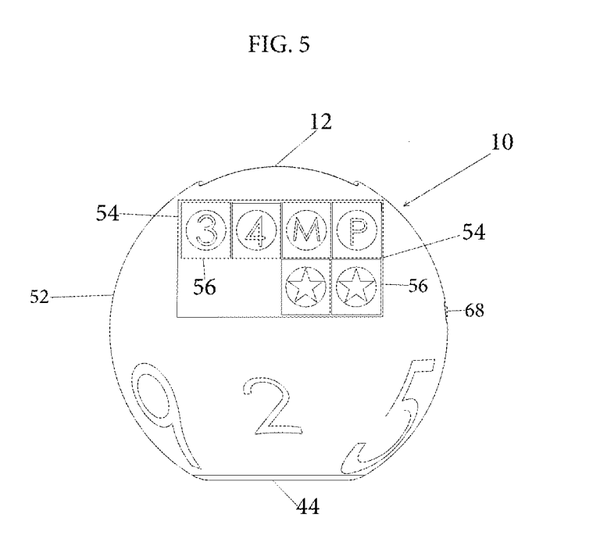
FIG. 5 illustrates an exemplary view of a number selection panel in accordance with the preferred embodiment of the present invention.
Figure 6:
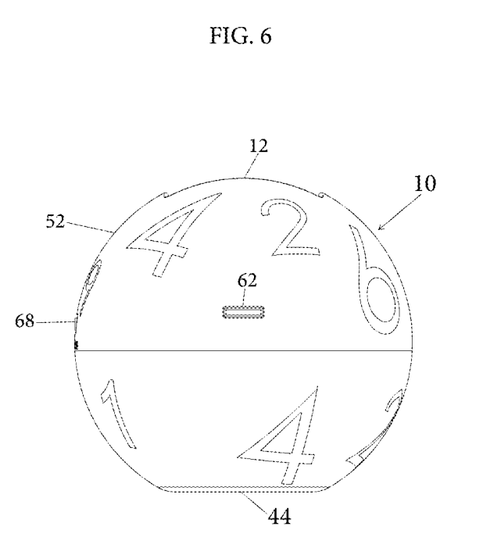
FIG. 6 illustrates a side view of an exemplary portable entertainment ball of the present invention.
Figure 7:
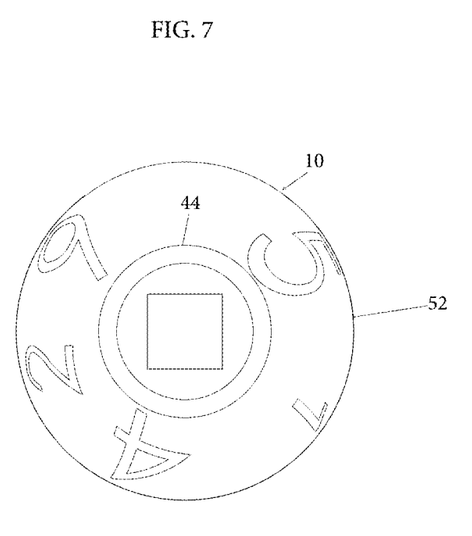
FIG. 7 illustrates an exemplary bottom view of the entertainment ball of the present invention.

The housing wall 52 of the portable entertainment ball 10 features a number selection panel 54 being in communication with the processor 28 and being adapted to provide a plurality of number selection buttons 56. The number selection panel 54 including at least two number selection buttons 56 being programmed to produce at least one randomly selected number on said display screen 12 once said number selection button 56 is pressed. The plurality of number selection buttons 56 further includes at least one number selection button 56 being programmed to produce three, four, five, or six randomly selected numbers on said display screen 12. Readable numbers for display on the display screen 12 are produced once any of the plurality of number selection buttons 56 is pressed.

The portable entertainment ball 10 also features a flattened base 44 for mounting the battery 66 and for a secure mounting on a flat surface. The rotation of the portable entertainment ball 10 is minimized and a user is quickly oriented toward the display screen 12. The flattened base 44 further provides a leveled engagement with the display screen 12 and enables the user to use the portable entertainment ball 10 efficiently and with increased control.

Figure 8:
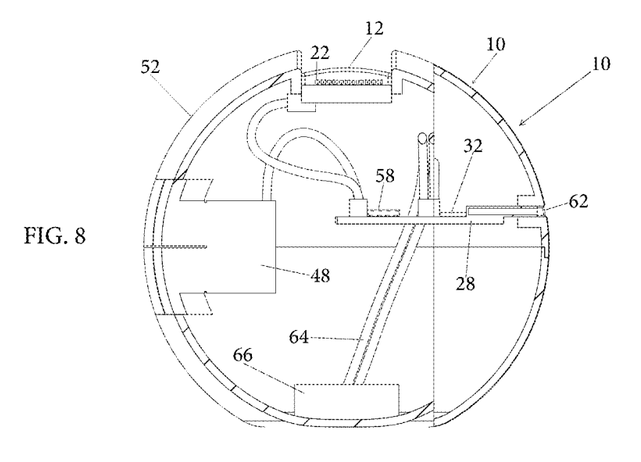
FIG. 8 illustrates an exemplary cross-sectional view of the entertainment ball of the present invention.

The circular housing parts of the portable entertainment ball 10 can be produced to easily detach and fasten as needed. For example, the housing top and housing bottom as can be seen in FIGS. 3-7 are locked in place when the portable entertainment ball 10 is updated and prepared for use. It is apparent that unlocking and re-inserting the housing top and bottom while in active use would pose difficulties for the user. The inventor anticipates that the portable entertainment ball 10 can be manufactured for simple unlocking, re-inserting, or screwing the respective housing parts into each other. Once the portable entertainment ball 10 is twisted into an open state, the various housing contents as shown in FIG. 8 can be adjusted or the user can simply replace the battery 66.

Additional features of the portable entertainment ball 10 include audio circuitry 58, a universal serial bus 62 (USB port) being mounted on the housing wall 52, and a battery circuit 64. The audio circuitry 58 produces audio signals to a user when any of the plurality of number selection buttons 56 in the number selection panel 54 is pressed. The battery circuit 64 has at least one battery 66 and an on/off switch 68 being connected to said battery circuit 64 for switching the portable entertainment ball 10 on and off as needed. It is possible to relocate the position of the on/off switch 68 to facilitate the proper usage of the portable entertainment ball 10. The entire area of the on/off switch 68 can be raised and the battery circuit 64 relocated from the areas seen in FIG. 8. It is also possible to move the area of the on/off switch 68 closer to the screen 12 and allow the user to quickly feel for the switch 68 without searching or rotating the device.

The number selection buttons 56 can be pre-programmed to select numbers for said specific lottery play patterns 36, a plurality of number ranges 42, specific lottery multipliers 38, and a plurality of lottery play patterns 36. The number selection buttons 56 are uniformly arranged in the number selection panel 54.

The portable entertainment ball 10 can be produced as a smaller, portable, key fob-size, and companion version of the regular portable entertainment ball 10 with identical capabilities and features and with a key ring 72 for enhanced usage as a portable device. This portable version will provide the ultimate in convenience with no sacrifice in functionality.

Although the invention has been explained in relation to its preferred embodiment, it is to be understood that many other possible modifications and variations can be made without departing from the spirit and scope of the invention.

What is claimed is:

1. A portable entertainment ball for random number selection and having a size suitable for handheld use, said portable entertainment ball further comprising:
   a. a display screen being mounted on said portable entertainment ball, said display screen having a user interface providing random number selection options, selection parameters for a plurality lottery games, LED lights that blink during the number selection process, and navigation buttons allow for scrolling through a list of states offering lotteries,
   b. a processor,
   c. a memory device coupled to said processor and storing instructions adapted to be executed by said processor, one or more custom-programmed software and databases, wherein said one or more custom-programmed software and databases are stored in said memory device and configured to be executed by said processor, the one or more custom-programmed software and databases including generating and storing numbers based on said plurality of lottery games, storing specific lottery play patterns, generating a plurality of specific lottery multipliers, generating and storing numbers based on a plurality of lottery number ranges, generating the required amount of numbers for said plurality of lottery games, storing audio programs, and utilizing a random number generating computer program, said random number generator computer program utilizing a series of math functions combined with a time injector to produce the chance sequence of numbers required for a selected lottery game in a chosen state,
   d. a housing wall having a number selection panel being in communication with said processor and being adapted to provide a plurality of number selection buttons; said plurality of number selection buttons including at least two number selection buttons being programmed to produce at least one randomly selected number on said display screen once said number selection button is pressed; said plurality of number selection buttons including at least one number selection button being programmed to produce three randomly selected numbers on said display screen once said number selection button is pressed; said plurality of number selection buttons including at least one number selection button being programmed to produce four randomly selected numbers on said display screen once said number selection button is pressed; said plurality of number selection buttons including a least one number selection buttons being programmed to produce five randomly selected numbers on said display screen once said number selection button is pressed; said plurality of number selection buttons including a least one number selection buttons being programmed to produce six randomly selected numbers on said display screen once said number selection button is pressed; said number selection buttons generating readable numbers for display on said display screen,
   e. audio circuitry for producing audio signals to a user when any of said plurality of number selection buttons in said number selection panel is pressed,
   f. a universal serial bus being mounted on said housing wall,
   g. a battery circuit coupled to said portable entertainment ball, said battery circuit having at least one battery and an on/off switch being connected to said battery circuit for switching on/off said portable entertainment ball, said on/off switch being mounted on said housing wall,
   h. a flattened base for mounting said battery thereto and for mounting said portable entertainment ball on a flat surface.

2. The number selection buttons of claim 1 wherein said number selection button is pre-programmed to select numbers for a specific lottery play pattern.

3. The number selection buttons of claim 1 wherein said number selection button is pre-programmed to select numbers for said plurality of lottery number ranges.

4. The number selection buttons of claim 1 wherein said number selection button is pre-programmed to select numbers for said plurality of specific lottery multipliers.

5. The number selection buttons of claim 1 wherein said plurality of number selection buttons is re-programmed to generate a plurality of lottery play patterns.

6. The number selection buttons of claim 1 wherein said plurality of number selection buttons is uniformly arranged in said number selection panel.

7. The portable entertainment ball of claim 1 wherein said portable entertainment ball is produced as a smaller, portable, key fob-size, companion version of said regular portable entertainment ball with identical capabilities and features.

8. The portable entertainment ball of claim 1 wherein said portable entertainment ball is attachable to a key ring.

* * * * *